(12) United States Patent
Al-Qafas

(10) Patent No.: US 7,506,473 B2
(45) Date of Patent: Mar. 24, 2009

(54) IRRIGATION DEVICE

(76) Inventor: Qassim A. Al-Qafas, P.O. Box 15206, Daiya (KW)

( * ) Notice: Subject to any disclaimer, the term of this patent is extended or adjusted under 35 U.S.C. 154(b) by 22 days.

(21) Appl. No.: 11/672,231

(22) Filed: Feb. 7, 2007

(65) Prior Publication Data

US 2008/0184620 A1    Aug. 7, 2008

(51) Int. Cl.
*A01G 25/00* (2006.01)
(52) U.S. Cl. .................. 47/81; 47/48.5; 47/64; 47/79
(58) Field of Classification Search ............ 47/48.5, 47/79, 81, 80, 64; 222/187; 261/99, 104, 261/107; 239/44–51.5, 34, 145; *A01G 27/04, A01G 27/06*
See application file for complete search history.

(56) References Cited

U.S. PATENT DOCUMENTS

| | | | |
|---|---|---|---|
| 2,747,332 A * | 5/1956 | Morehouse | 47/81 |
| 4,231,187 A * | 11/1980 | Greenbaum | 47/80 |
| 4,829,709 A * | 5/1989 | Centafanti | 47/79 |
| 4,970,823 A * | 11/1990 | Chen et al. | 47/48.5 |
| 6,023,886 A * | 2/2000 | Momiyama et al. | 47/81 |
| 6,321,487 B1 * | 11/2001 | Sardanelli et al. | 47/81 |

FOREIGN PATENT DOCUMENTS

| | | | |
|---|---|---|---|
| JP | 11032602 A | * | 2/1999 |
| JP | 2000014260 A | * | 1/2000 |

* cited by examiner

*Primary Examiner*—Andrea M Valenti
(74) *Attorney, Agent, or Firm*—Lowe Hauptman Ham & Berner, LLP

(57) ABSTRACT

An irrigation device for delivering water to the roots of a plant include an elongated mass of capillary material bound together by an impermeable sheath with a pair of cone shaped ends. A sponge like filter covers an upper one of the cone shaped ends and a second porous filter covers the opposite end. A plurality of impermeable tapered rings are provided for blocking off one or more portions of the capillary material to prevent water from flowing through those portions.

1 Claim, 2 Drawing Sheets

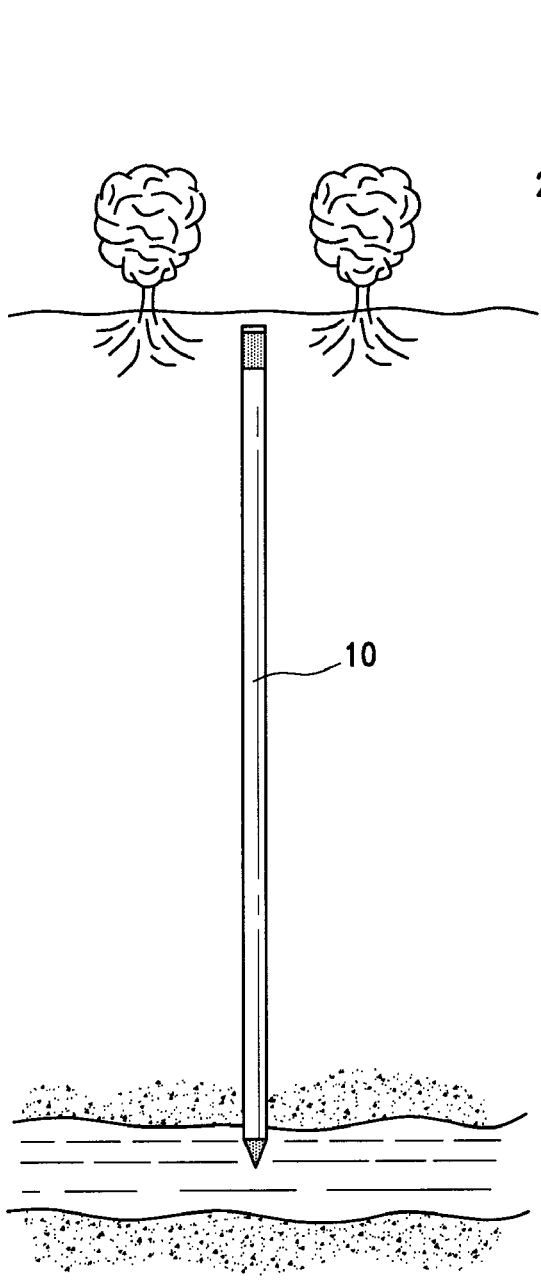
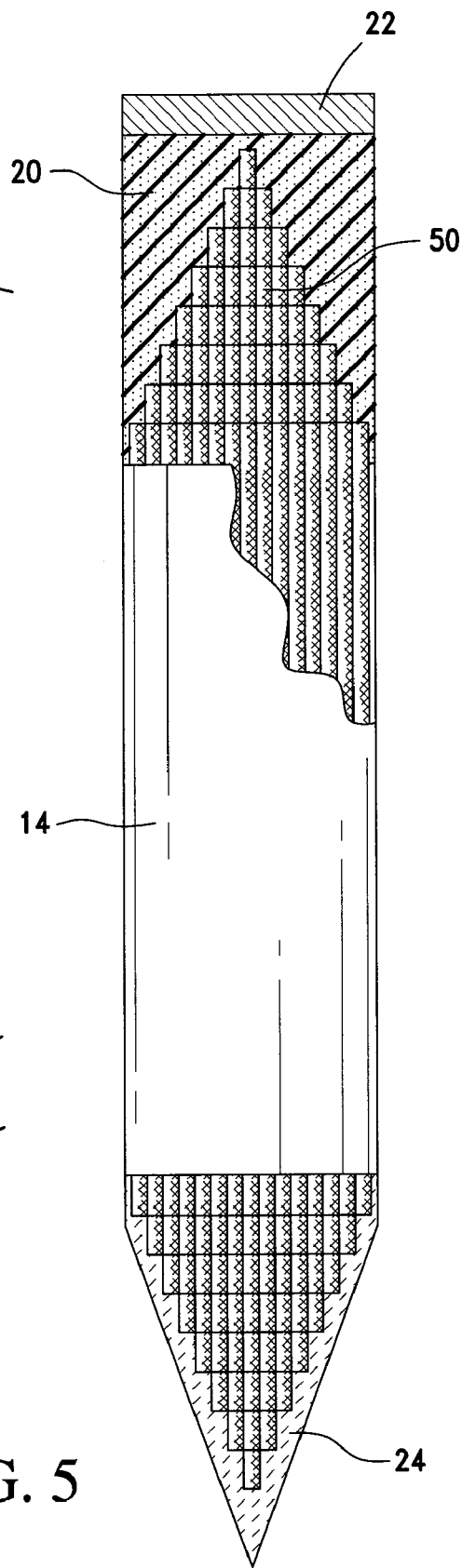
FIG. 4
FIG. 5

IRRIGATION DEVICE

FIELD OF THE INVENTION

This invention relates to an irrigation device for delivering water from a remote area to an area of soil surrounding the roots of a plant and more particularly to an irrigation device that includes a bundle of capillary tubes.

BACKGROUND FOR THE INVENTION

Live plants including trees, shrubs, flowers and vegetables are commonly used for decoration and food and placed in various locations. The problem is that different plants require different amounts of water and many locations do not provide sufficient water for many plants. In the past, people have watered their plants as for example by providing irrigation equipment such as sprinklers or merely adding water to their plants as needed. In places, professional water service personnel are employed. As for example in arid climates, trucks are used to water Palm trees and the like. Nevertheless, for those who want to place different types of plants in different areas there is a problem in providing the proper amount of water for each type of plant.

A number of self-watering planters have been developed for household and office plants. Self-watering planters typically include a water reservoir connected to a planter in a way that the planter can draw water from the reservoir as needed by the plant. In this way other water does not need to be added to the plant. In such planters there is no need to add water to the soil because water is automatically drawn from the reservoir into the soil as the soil dries out. The frequency by which the reservoir needs to be replenished is usually far less than the need to water the plant. Accordingly, such planters are particularly desirable for vacations and other periods when an individual is away and cannot water a plant on an as needed basis.

A typical self-watering planter includes a planter portion and a water reservoir integrally formed as a single unit. Flow holes are formed in a base of the planter to permit roots to grow into the water supply portion. In addition, the planter includes an upwardly extending conduit extending from the reservoir to the top of the planter to permit water to be poured into a top opening in the conduit.

A problem associated with self-watering planters in the aforementioned type resides in their cost and a need for planters of many different sizes and shapes. Further, such planters are not believed to be suitable for use with many outdoor plants as for example, shrubs, trees and the like.

An alternative self-watering planter is disclosed in a Whitaker, U.S. Pat. No. 5,046,282. As disclosed thereto, an automatic soil watering device for potted plants includes an airtight water supply chamber with a discharge into the soil controlled by a hydrophilic probe element followed by a hydrophobic element. The soil watering device also contains an entrapment chamber. Soil air is passed into the water supply chamber to discharge a proportional amount of water into the soil. Water discharge is controlled by means of a well open to the water supply chamber and with a capillary wick exposed to the rise of water in the well and extending into the soil.

A more recent development in self-watering planters is disclosed in a Colovic, U.S. Pat. No. 6,079,156. As disclosed therein, a self watering assembly includes a set of water-permeable flow hole inserts each including a portion of capillary material such as spandex. The flow hole inserts are inserted into a flow hole of the planter for direct contact with soil positioned therein. The flow hole inserts are sized and shaped to securely fit within the flow hole preventing soil from falling out of the flow hole and preventing roots from growing through the flow hole. Additional capillary material, also formed of spandex, couples an interior of a water reservoir to the capillary material of the water-permeable inserts. By using spandex as the capillary material, sufficient capillary flow may be achieved to properly water even medium to large sized plants. By employing water-permeable inserts for insertion into the planter wherein the inserts have capillary material mounted therein, water can be more effectively drawn into the soil of the planter. Also, upon removal of the planter from the water reservoir, the inserts typically remain mounted within the flow holes of the planter such that soil from the planter is prevented from falling out of the planter.

Notwithstanding the above, it is presently believed that there maybe a need and a commercial market for an improved irrigation system for delivering water from a remote area to an area of soil surrounding the roots of a plant in accordance with the present invention. There should be a demand for such devices because they are applicable for use with non-potted plants and adaptable for plants of different sizes and with different types of soil. Further, it is believed that the devices in accordance with the present invention are relatively inexpensive to manufacture and durable. It is also believed that the devices are resistant to clogging and readily modified for controlling the flow of water.

BRIEF SUMMARY OF THE INVENTION

An irrigation device for delivering water from a remote area to an area of soil surrounding the roots of a plant include a longitudinally extending cylindrically shaped bundle of capillary material and/or tubes extending from a source of water to an area to be irrigated. The bundle of capillary tubes is preferably bound together and includes upper and lower cone shaped ends so that the capillary tubes connecting outer portions of the cone shaped ends are shorter that the capillary tubes connecting an inner area of the coned shaped ends. A first cylindrically shaped filter having a peripheral surface surrounds the upper cone shaped end and an impermeable cover or top of the first cylindrical shaped filter is provided. In addition, a second filter having the shape of a cone is superimposed on and covering the lower cone shaped end so that water from a source of water is drawn up by capillary action and delivered to an area surrounding the upper cone shaped end.

In a preferred embodiment of the invention one or more impermeable tapered rings such as polyvinyl chloride or polyethylene are constructed and arranged to fit snugly over one of the cone shaped ends to prevent water from flowing through a part of the bundle of capillary tubes. In this way a single size device can be used for plants that require different amounts of water.

The invention will now be described in connection with the following drawings wherein like reference numerals have been used to identify like parts.

DESCRIPTION OF THE DRAWINGS

FIG. 4 is a perspective view of a plant, a remote water supply and a device for connecting an area surrounding the roots of a plant to the water supply; and FIG. 5 is a cross sectional view of an irrigation device according to a second embodiment of the invention.

DESCRIPTION OF THE PREFERRED EMBODIMENTS OF THE INVENTION

Figure 1:
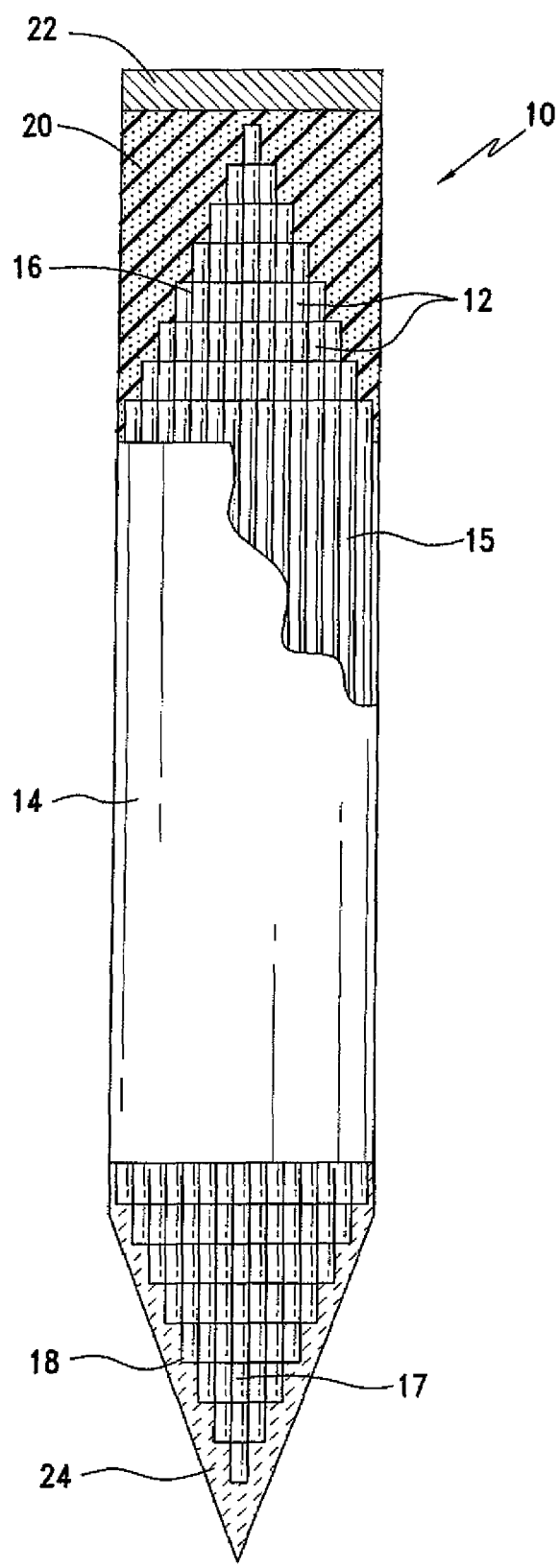
FIG. 1 is a side elevation view of an irrigation device in accordance with a preferred embodiment of the invention.
Figure 2:
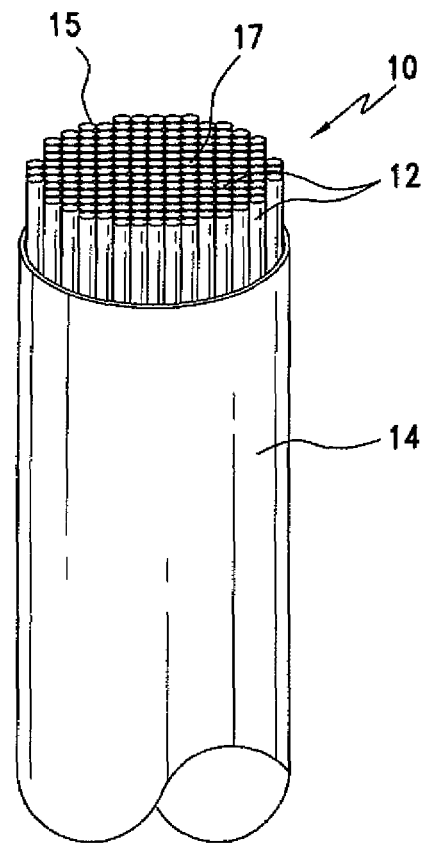
FIG. 2 is schematic view illustration showing the cross section of a middle portion of the irrigation device shown in FIG. 1.

As illustrated in FIGS. 1 and 2, an irrigation device 10 in accordance with a preferred embodiment of the present invention includes a longitudinally extending cylindrically shaped bundle of capillary material or tubes 12 i.e. a plurality of slender tubes having small bores for transporting water by capillary action from a remote source of water to a mass of soil surrounding the roots of a plant. In a preferred embodiment of the invention, the bundle of capillary tubes 12 are tightly bound together by an outer polyethylene sheath or tube 14 that extends around the bundle of capillary tubes 12.

The bundle of capillary tubes 12 also includes or defines an upper cone shaped end and a lower cone shaped end portions 16 and 18 respectively so that the capillary tubes in an outer portion 15 of the bundle are shorter than the capillary tubes in an inner portion 17. The shorter capillary tubes connect the base of the cone shaped ends while the central tubes connect the area around the apex of the cone shaped ends 16 and 18.

A first cylindrical shaped filter 20 of sponge like or porous material with inner-connecting cells is provided. In a preferred embodiment of the invention a cylindrically shaped elastomer sponge having a concave cone shaped central hollowed out portion is fit over the convex cone shaped upper end portion 16 and is superimposed thereon in order to be in intimate contact therewith. An impermeable cover 22 is fixed at the top of the cylindrical filter 20 at the top of the apex of the upper cone shaped end portion 16 and is generally perpendicular to the vertical axes of the upper cone shaped end 16.

A second porous filter 24 has a cone shaped and is superimposed on the cone shaped end 18 and in intimate contact therewith and covers the ends of the capillary tubes. The second filter is preferable made of durable material such as a ceramic and protects the capillary tubes from particles of dirt (earth) from being drawn into and clogging the capillary tubes. Thus, when the lower end 18 of the device 10 is placed in water the bundle of capillary tubes draw the water up through the capillary tubes for distribution into the soil surrounding the upper cone shaped end portion 16. An impermeable sheath or cover 14 that confines the capillary material also prevents water from being distributed intermediate of the ends 16 and 18.

Capillary action continues to draw water vertically through the bundle of capillary tubes which are in indirect contact with the soil through the sponge like filters. The liquid is then absorbed into the soil and is consequently withdrawn from the soil by a plant by its roots. As the liquid is withdrawn from the soil by the plant via roots of the plant continued capillary action replaces it.

Figure 3:
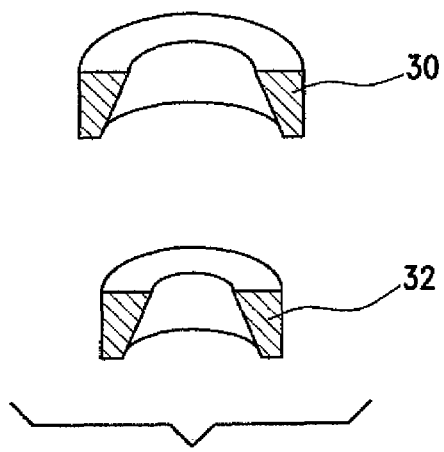
FIG. 3 is a perspective view of a plurality of tapered rings for controlling the flow of water through an irrigation device in accordance with the present invention.

FIG. 3 illustrates a plurality of impermeable tapered rings 30 and 32 which can be placed over the upper cone shaped end 16 to restrict the amount of water delivered to the soil. One or more tapered rings may be placed between the cone shaped upper end portion 16 and the filter 20. In this way a single size device may be used to deliver different amounts of water to different plants. The rings 30 and 32 may be of a plastic material such as polyvinyl chloride, polyethylene, etc. It is also contemplated that the cover 22 may be made of capillary material such as a textile made from poly urethane to aid in the distribution of water.

The capillary material employed within the device may be formed of spandex i.e. a textile material formed of poly urethane or other hair like tubes. An advantage of spandex is that it is in expensive, readily available from multiple sources and readily formed into various shapes. It is also relatively immune to deterioration. (Col. 6 of cited patent).

FIG. 4 illustrates the use of a filter device 10 and a method contemplated by the present invention. As illustrated an irrigation device 10 as described here and above is provided and a hole is formed connecting the area of a plants root to a source of underground or remote water. The device 10 has sufficient length to extend from the roots of a plant to the source of water. A passage way or hole is formed and is adjacent to the roots of a plant. The device is then placed in the passageway and the passage way filled in with dirt. The plant will then receive water by capillary action as described above. Further, the amount of water delivered to the plant can be controlled to a degree by inserting the tapered rings over one of the cone shaped ends as for example the top end i.e. the one nearest the roots of the plant.

A further embodiment of the invention is illustrated in FIG. 5 wherein a mass of capillary material such as spandex is confined by an outer sheath 14 of impermeable material such as vinyl, plastic or polyethylene and includes a first cone shaped end 50 confined by a perforated cone or by the ceramic filter 24. The use of impermeable material is important so that water is delivered to the ends of the device i.e. to the roots of the plant and not distributed intermediate thereof. The second cone shaped end 50 is shown in contact with a cylindrical shaped filter 20 of sponge like or other porous material. An upper portion of the filter 20 is in contact with an impervious cover 22 that is fixed to the top end of the cylindrical filter 20.

While the invention has been disclosed in connection with its preferred embodiments it should be recognized that changes and modifications may be made therein without departing from the scope of the claims.

What is claimed is:

1. An irrigation device for delivering water directly from a remote area to an area of soil surrounding the roots of a plant, said device comprising:

a longitudinally extending cylindrically shaped bundle of capillary material including a plurality of tubes extending from a source of water to an area to be irrigated;

said bundle of capillary material including a plurality of tubes bound together in contact with one another by an outer impermeable polyethylene sheath and said plurality of tubes extend from an upper cone shaped end to a lower cone shaped end so that said plurality of tubes in an outer portion of said bundle are shorter than the plurality of tubes in an inner portion of said bundle and a first cylindrical shaped sponge filter having a peripheral surface surrounding said upper cone shaped end and an impermeable cover on top of said first cylindrically shaped filter;

a second filter of porous ceramic having a shape of a cone superimposed on and covering said lower cone shaped end so that the water from the source of water is drawn up by capillary action and delivered to an area surrounding said upper cone shaped end; and including a plurality of impervious plastic tapered rings adapted to fit over and in contact with one of said cone shaped ends for reducing the flow of water through said device.

* * * * *